United States Patent
Yokoo et al.

(10) Patent No.: US 11,717,916 B2
(45) Date of Patent: Aug. 8, 2023

(54) CYLINDRICAL BATTERY AND METHOD OF MANUFACTURING SAME

(71) Applicant: SANYO Electric Co., Ltd., Daito (JP)

(72) Inventors: Ryunosuke Yokoo, Hyogo (JP); Kazumichi Shimizu, Osaka (JP)

(73) Assignee: Panasonic Energy Co., Ltd., Osaka (JP)

( * ) Notice: Subject to any disclaimer, the term of this patent is extended or adjusted under 35 U.S.C. 154(b) by 248 days.

(21) Appl. No.: 16/981,442

(22) PCT Filed: Feb. 18, 2019

(86) PCT No.: PCT/JP2019/005859
§ 371 (c)(1),
(2) Date: Sep. 16, 2020

(87) PCT Pub. No.: WO2019/187776
PCT Pub. Date: Oct. 3, 2019

(65) Prior Publication Data
US 2021/0066697 A1    Mar. 4, 2021

(30) Foreign Application Priority Data

Mar. 30, 2018    (JP) .................... 2018-069526

(51) Int. Cl.
*H01M 10/04* (2006.01)
*H01M 50/536* (2021.01)
(Continued)

(52) U.S. Cl.
CPC ............. *B23K 26/02* (2013.01); *H01M 10/04* (2013.01); *H01M 50/534* (2021.01); *H01M 50/536* (2021.01)

(58) Field of Classification Search
CPC .. H01M 50/531; H01M 10/04; H01M 50/536; B23K 26/02
See application file for complete search history.

(56) References Cited

U.S. PATENT DOCUMENTS

2009/0317712 A1   12/2009 Kim et al.
2011/0151297 A1    6/2011 Shimizu et al.

FOREIGN PATENT DOCUMENTS

CN    102160208 A    8/2011
JP    4-162351 A     6/1992
(Continued)

OTHER PUBLICATIONS

International Search Report dated Apr. 9, 2019 issued in counterpart International Application No. PCT/JP2019/005859. (1 page).

(Continued)

Primary Examiner — Christopher P Domone
Assistant Examiner — Kimberly Wyluda
(74) Attorney, Agent, or Firm — WHDA, LLP (57) ABSTRACT

A cylindrical battery includes a bottom-closed cylindrical exterior package can which receives an electrode body. A lead connected to one of a positive electrode and a negative electrode of the electrode body is extended from the electrode body and is welded to a bottom portion of the exterior package can. When the bottom portion is viewed from the outside of the exterior package can, at least a part of the welding portion between the lead and the bottom portion formed by a molten mark is formed outside of a concentric circle of the bottom portion which has a diameter equivalent to the width of the lead.

2 Claims, 4 Drawing Sheets

(51) Int. Cl.
*B23K 26/02* (2014.01)
*H01M 50/534* (2021.01)

(56) References Cited

FOREIGN PATENT DOCUMENTS

| | | |
|---|---|---|
| JP | 9-330697 A | 12/1997 |
| JP | 2010-3686 A | 1/2010 |
| JP | 2012-4074 A | 1/2012 |
| JP | 2017-107647 A | 6/2017 |
| WO | 2010/150458 A1 | 12/2010 |

OTHER PUBLICATIONS

English Translation of Office Action dated Apr. 20, 2022, issued in counterpart CN Application No. 201980020253.6. (3 pages).

CYLINDRICAL BATTERY AND METHOD OF MANUFACTURING SAME

TECHNICAL FIELD

The present disclosure relates to a cylindrical battery and a method for manufacturing the same.

BACKGROUND ART

Heretofore, as one type of battery, a cylindrical battery in which an electrode body is received in a bottom-closed cylindrical exterior package can has been known.

In the past, in the cylindrical battery, an exterior package can and a lead connected to one of a positive electrode and a negative electrode of an electrode body were welded to each other mainly by resistance welding at an inner surface of a bottom portion of the exterior package can. On the other hand, in recent years, welding has also been performed between the exterior package can and the lead by radiation of energy beams, such as laser light, from the outside of the bottom portion of the exterior package can (for example, see PTLs 1 and 2).

CITATION LIST

Patent Literature

PTL 1: Japanese Published Unexamined Patent Application No. 2010-3686
PTL 2: Japanese Published Unexamined Patent Application No. 4-162351

SUMMARY OF INVENTION

Technical Problem

In the cylindrical battery in which the lead is welded to the exterior package can by radiation of energy beams from the outside of the exterior package can, after the electrode body is inserted in the exterior package can, even when the electrode body is rotated in the exterior package can, the energy beams are required to be radiated to a position at which the bottom portion of the exterior package can and the lead face each other. Hence, in the past, regardless of the rotation of the electrode body in the exterior package can, in order to always radiate the energy beams to the position at which the bottom portion of the exterior package can and the lead face each other, the energy beams are radiated to a central area of the bottom portion of the exterior package can. In particular, the energy beams are radiated to a part of the bottom portion of the exterior package can which faces a hollow portion located at a winding center of the electrode body and in addition, only to the inside of a circle having a diameter equivalent to the width of the lead. Accordingly, a welding portion welding the bottom portion and the lead is formed only by a part corresponding to the inside of this circle. However, in the battery as described above, since the welding portion is formed only at the center of the bottom portion of the exterior package can, when a force is applied to the battery so as to rotate the electrode body with respect to the exterior package can, a welding strength between the exterior package can and the lead may be insufficient in some cases against a force applied to the welding portion in the rotation direction of the electrode body. Heretofore, although the inconvenience which occurs when the lead is welded to the exterior package can by radiation of the energy beams thereto has been described, an inconvenience similar to that described above may also occur in some cases when the lead is welded to the exterior package can by resistance welding.

In the cylindrical battery and a method for manufacturing the same, the present disclosure aims to improve the welding strength between the exterior package can and the lead against a force to be applied to the welding portion between the exterior package can and the lead in the rotation direction of the electrode body.

Solution to Problem

A cylindrical battery according to the present disclosure comprises: an electrode body in which a positive electrode and a negative electrode are spirally wound with a separator interposed therebetween; and a bottom-closed cylindrical exterior package can which receives the electrode body. In the cylindrical battery described above, a lead connected to one of the positive electrode and the negative electrode is extended from the electrode body and is welded to a bottom portion of the exterior package can, and when the bottom portion is viewed from the outside of the exterior package can, at least a part of a welding portion between the lead and the bottom portion formed by a molten mark is formed outside of a concentric circle of the bottom portion having a diameter equivalent to the width of the lead orthogonal to a direction extended from the electrode body.

A method for manufacturing a cylindrical battery according to the present disclosure is a method for manufacturing the cylindrical battery according to the present disclosure. In the method described above, of two end surfaces of the electrode body orthogonal to a winding axis thereof, on one end surface opposite to the welding portion between the lead and the bottom portion of the exterior package can, a marking which indicates a position of the lead facing the other end surface is displayed, and while the marking is detected, energy beams are radiated from the outside of the bottom portion to a part of the bottom portion which faces the lead to form the welding portion.

Advantageous Effects of Invention

According to the cylindrical battery and the method for manufacturing the same of the present invention, the welding portion between the lead and the exterior package can may be formed without being restricted at the center of the bottom portion of the exterior package can. Accordingly, since the welding is performed at a position far apart from a rotation center of the electrode body to an outer circumferential side, when a force in the rotation direction of the electrode body is applied to the welding portion between the exterior package can and the lead, the moment of a force applied to a welding portion between the exterior package can and the lead in the rotation direction can be decreased. Furthermore, the area of the welding portion may also be increased. Hence, against the force applied to the welding portion between the exterior package can and the lead in the rotation direction of the electrode body, the welding strength can be increased.

DESCRIPTION OF EMBODIMENTS

Hereinafter, embodiments according to the present disclosure will be described in detail with reference to the attached drawings. In the following description, particular shapes, materials, numerical values, directions, and the like are described by way of example in order to facilitate the understanding of the present disclosure and each may be appropriately changed in accordance with the specification of a cylindrical battery. In addition, in the following description, the term "approximately" indicates, besides the case in which at least two objects are exactly the same, the case in which at least two objects are regarded as substantially the same. Furthermore, when embodiments and modified examples are included in the following description, the characteristics thereof have been assumed from the beginning to be appropriately used in combination.

In addition, hereinafter, although the case in which the cylindrical battery is a lithium ion secondary battery will be described, the battery is not limited thereto and may be another secondary battery, such as a nickel hydrogen battery or a nickel cadmium battery, or a primary battery, such as a dry battery or a lithium battery.

Figure 1:
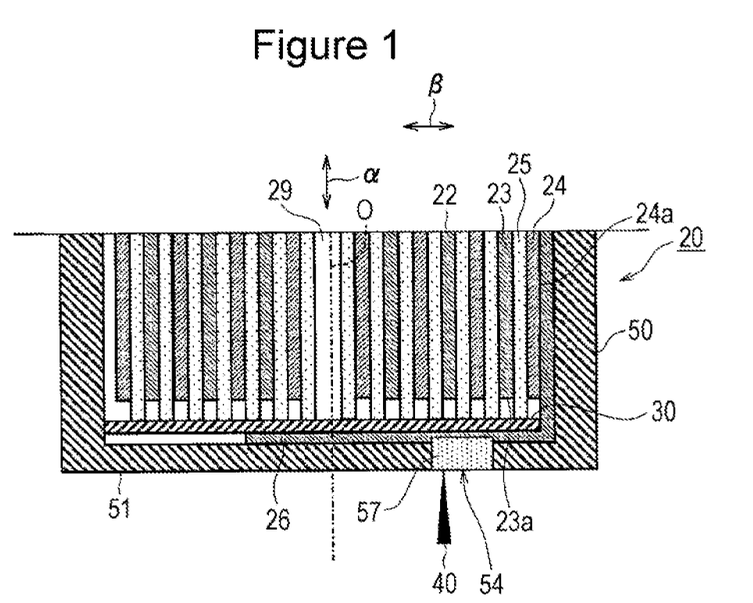
FIG. 1 is a cross-sectional view of a bottom surface-side half of a cylindrical battery according to an example of an embodiment.
Figure 2:
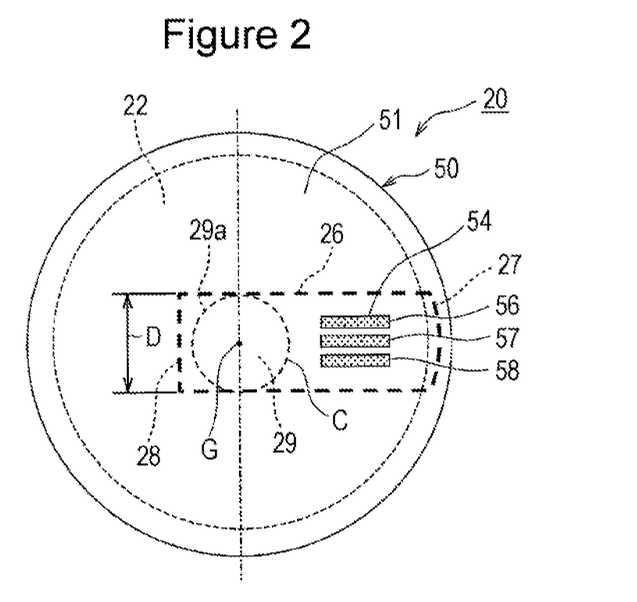
FIG. 2 is a plan view of a bottom plate of the cylindrical battery shown in FIG. 1.
Figure 3:
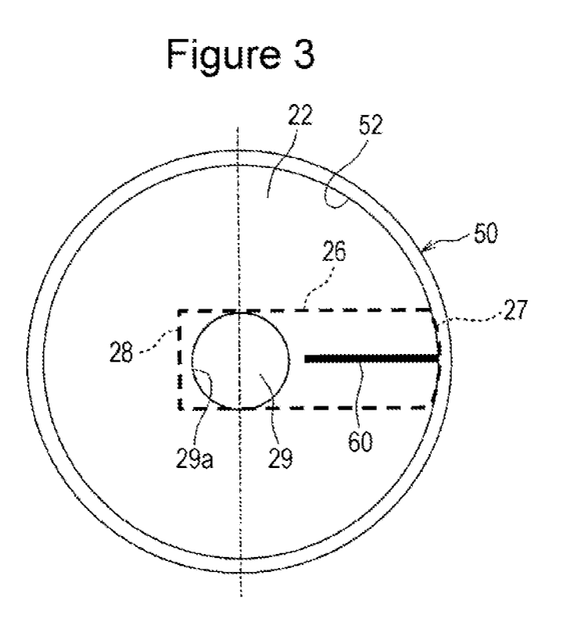
FIG. 3 is a schematic view showing the case in which, in the example of the embodiment, an electrode body on which a marking is displayed is viewed from an opening side of an exterior package can.

FIG. 1 is a cross-sectional view of a bottom surface-side half of a cylindrical battery 20 according to one example of the embodiment. FIG. 2 is a bottom surface portion of the cylindrical battery 20. FIG. 3 is a schematic view showing the case in which, in the above one example of the embodiment, an electrode body 22 on which a marking 60 is displayed is viewed from an opening side of an exterior package can 50. Hereinafter, the cylindrical battery 20 will be described as the battery 20.

As shown in FIGS. 1 to 3 by way of example, the battery 20 includes the winding type electrode body 22, a nonaqueous electrolyte (not shown), and the exterior package can 50. The winding type electrode body 22 includes a positive electrode 23, a negative electrode 24, and at least one separator 25, and the positive electrode 23 and the negative electrode 24 are spirally wound with the separator 25 interposed therebetween. Hereinafter, in some cases, one winding axial direction side of the electrode body 22 may be called "upper side", and the other winding axial direction side may be called "lower side". An electrode body in which a plurality of positive electrodes and a plurality of negative electrodes are alternately laminated with separators interposed therebetween may also be used. The nonaqueous electrolyte contains a nonaqueous solvent and an electrolyte salt, such as a lithium salt, dissolved in the nonaqueous solvent. The nonaqueous electrolyte is not limited to a liquid electrolyte and may be a solid electrolyte using a gel polymer or the like.

The positive electrode 23 includes a belt-shaped positive electrode collector 23a, and to this collector 23a, a positive electrode lead (not shown) is connected. The positive electrode lead is an electrically conductive member which electrically connects the positive electrode collector 23a to a positive electrode terminal (not shown) and is extended from an end surface at an upper side (upper side in FIG. 1) of the electrode body 22 orthogonal to the winding axis thereof. The positive electrode lead is provided at an approximately central portion of the electrode body 22 in a radius direction β thereof.

The negative electrode 24 includes a belt-shaped negative electrode collector 24a, and to this collector 24a, a negative electrode lead 26 is connected. The negative electrode lead 26 is an electrically conductive member which electrically connects the negative electrode collector 24a to the exterior package can 50 functioning as a negative electrode terminal and is extended from an end surface at a lower side (lower side in FIG. 1) of the electrode body 22 orthogonal to the winding axis thereof. The negative electrode lead 26 is provided at a winding-finish side end portion of the negative electrode 24.

A constituent material of each lead is not particularly limited. The positive electrode lead may be formed from a metal containing aluminum as a primary component, and the negative electrode lead 26 may be formed from a metal containing nickel or copper as a primary component or a metal containing both nickel and copper. The negative electrode lead 26 may also be formed from nickel-plated iron. A plurality of positive electrode leads and a plurality of negative electrode leads each may also be provided.

The negative electrode lead 26 is bent at an approximately right angle near a round bottom portion 51 of the exterior package can 50 which will be described later and is disposed along an inner surface of the bottom portion 51 so as to extend to a position which faces a hollow winding core portion 29 of the electrode body 22 with an insulating plate 30 interposed therebetween. A part of the negative electrode lead 26 which is along the inner surface of the bottom portion 51 is overlapped on and is brought into contact with this inner surface. In addition, in the state described above, since a laser light 40 is radiated from the outside of the exterior package can 50 to a part of the bottom portion 51 which faces the negative electrode lead 26, the exterior package can 50 and the negative electrode lead 26 are welded to each other with a welding group 54. As shown in FIG. 2, the welding group 54 is formed of three welding portions 56, 57, and 58. The welding portions 56, 57, and 58 are each formed from an outside surface of the exterior package can 50 to the negative electrode lead 26. The laser light 40 corresponds to energy beams.

As shown in FIG. 2, when the bottom portion 51 is viewed from the outside (lower side in FIG. 1) of the exterior package can 50, planar shapes of the welding portions 56, 57, and 58 are each a straight line. In addition, the welding portion according to the present disclosure indicates a portion formed by a molten mark which is obtained by melting the exterior package can 50 and the negative electrode lead 26 by radiation of the laser light 40 (FIG. 1) thereto, followed by solidification. The welding group 54 and a welding step will be described later in detail.

The exterior package can 50 has the round bottom portion 51 and is a bottom-closed cylindrical container which receives the electrode body 22. The exterior package can 50 is formed by processing a nickel-plated iron material into a bottom-closed cylindrical shape. The exterior package can is not limited to a container formed from the material mentioned above, and in consideration of the type and the characteristics of the battery, an appropriately selected metal material, such as copper or nickel, may be used.

An opening portion 52 (FIG. 3) of the exterior package can 50 is sealed by a sealing gasket (not shown) formed of an insulating material and a sealing body (not shown). In this case, the sealing body is fitted to the opening portion 52 of the exterior package can 50 with the gasket interposed therebetween, and the opening portion 52 of the exterior package can 50 is air-tightly sealed by caulking. The exterior package can 50 receives the electrode body 22 and the nonaqueous electrolyte. At the lower side of the electrode body 22, the insulating plate 30 (FIG. 1) is disposed. The negative electrode lead 26 is extended along the bottom portion of the exterior package can 50 through the outside of the insulating plate 30 and is welded to the inner surface of the bottom portion 51 of the exterior package can 50. The thickness of the bottom portion 51 which is a bottom portion of the exterior package can 50 is, for example, 0.2 to 0.5 mm. At the upper side of the electrode body 22, as is the case of the lower side, an insulating plate (not shown) is preferably disposed.

Again with reference with FIG. 1, the electrode body 22 has a winding structure in which the positive electrode 23 and the negative electrode 24 are spirally wound with the separators 25 interposed therebetween. Since being formed to have belt shapes and being spirally wound together, the positive electrode 23, the negative electrode 24, and the separators 25 are alternately laminated to each other in the radius direction β of the electrode body 22. In this embodiment, the winding core portion 29 including a winding central axis O of the electrode body 22 is a cylindrical space.

The positive electrode 23 includes the positive electrode collector 23a having a belt shape, that is, a long sheet shape and at least one positive electrode active material layer formed on this collector. For example, on two surfaces of the positive electrode collector 23a, the positive electrode active material layers are formed. For the positive electrode collector 23a, for example, foil of a metal, such as aluminum, stable in a potential range of the positive electrode or a film having a surface layer formed of the metal mentioned above may be used. As a preferable positive electrode collector 23a, foil of a metal, such as aluminum or an alloy containing aluminum as a primary component, stable in a potential range of the positive electrode may be mentioned.

The positive electrode active material layer preferably contains a positive electrode active material, an electrically conductive agent, and a binding agent. The positive electrode 23 is formed, for example, such that after a positive electrode mixture slurry containing the positive electrode active material, the electrically conductive agent, the binding agent, a solvent, such as N-methyl-2-pyrrolidone (NMP), and the like is applied on the two surfaces of the positive electrode collector 23a, drying and rolling are performed.

As the positive electrode active material, for example, a lithium transition metal oxide containing a transition metal element, such as Co, Mn, or Ni, may be mentioned. Although the lithium transition metal oxide is not particularly limited, a composite oxide represented by general formula $Li_{1+x}MO_2$ (in the formula, $-0.2<x\leq0.2$ and M is at least one of Ni, Co, Mn, and Al) is preferable.

As an example of the above electrically conductive agent, for example, there may be mentioned a carbon material, such as carbon black (CB), acetylene black (AB), Ketjen black, or graphite. As an example of the above binding agent, for example, there may be mentioned a fluorine-based resin, such as a polytetrafluoroethylene (PTFE) or a poly (vinylidene fluoride) (PVdF), a polyacrylonitrile (PAN), a polyimide (PI), an acrylic resin, or a polyolefinic resin. In addition, those resins each may be used together with a carboxymethyl cellulose (CMC) or its salt, a polyethylene oxide (PEO), or the like. Those materials may be used alone, or at least two types thereof may be used in combination.

The negative electrode 24 includes a belt-shaped negative electrode collector 24a and at least one negative electrode active material layer formed on the negative electrode collector. For example, on two surfaces of the negative electrode collector 24a, the negative electrode active material layers are formed. For the negative electrode collector 24a, for example, foil of a metal, such as aluminum or copper, stable in a potential range of the negative electrode or a film having a surface layer formed of the metal mentioned above may be used.

The negative electrode active material layer is preferably formed over the entire region of each of the two surfaces of the negative electrode collector 24a except for an uncoated area which will be described later. The negative electrode active material layer preferably contains a negative electrode active material and a binding agent. The negative electrode active material layer may also contain an electrically conductive agent, if needed. The negative electrode 24 is formed, for example, such that after a negative electrode mixture slurry containing the negative electrode active material, the binding agent, water, and the like is applied on the two surfaces of the negative electrode collector 24a, drying and rolling are performed.

The negative electrode active material is not particularly limited as long as being capable of occluding and releasing lithium ions, and for example, a carbon material, such as natural graphite or artificial graphite, a metal, such as Si or Sn, forming an alloy with lithium, or an alloy or a composite oxide containing at least one of those mentioned above may be used. For the binding agent contained in the negative electrode active material layer, for example, a resin similar to that for the positive electrode 23 may be used. When the negative electrode mixture slurry is prepared using an aqueous solvent, for example, a styrene-butadiene rubber (SBR), a CMC or its salt, a poly(acrylic acid) or its salt, or a poly(vinyl alcohol) may be used. Those compounds mentioned above may be used alone, or at least two types thereof may be used in combination.

The negative electrode 24 has the uncoated area at which the surface of the metal forming the negative electrode collector 24a is exposed. The uncoated area is an area to which the negative electrode lead 26 is connected and is an area in which the surface of the negative electrode collector 24a is not covered with the negative electrode active material layer. The uncoated area has, when viewed from the front, an approximately rectangular shape extending long in a winding axial direction α which is a width direction of the negative electrode 24 and is formed wider than the negative electrode lead 26.

The negative electrode lead 26 is bonded to the surface of the uncoated area of the negative electrode collector 24a by welding, such as ultrasonic welding. The uncoated area is provided, for example, by intermittent coating in which the negative electrode mixture slurry is not applied on a part of the negative electrode collector 24a.

The positive electrode lead is bonded to an uncoated area of the positive electrode collector 23a, and a part of the positive electrode lead which projects from the positive electrode collector 23a toward the upper side is connected to the positive electrode terminal or a portion connected to the positive electrode terminal.

For the separator 25, for example, a porous sheet having an ion permeability and an insulating property may be used. As a particular example of the porous sheet, for example, a fine porous thin film, a woven cloth, or a non-woven cloth may be mentioned. As a material of the separator 25, for example, an olefin resin, such as a polyethylene or a polypropylene, is preferable.

The welding portions 56, 57, and 58 (FIG. 2) forming the welding group 54 are each formed from the molten mark as described above. As shown in FIG. 2, when the welding group 54 is viewed from the outside (lower side in FIG. 1) of the bottom portion 51 of the exterior package can 50, the three welding portions 56, 57, and 58 are formed to be in parallel to each other along a radius direction of the bottom portion 51.

The three welding portions 56, 57, and 58 have approximately the same length. Furthermore, when the bottom portion 51 is viewed from the outside of the exterior package can 50 as shown in FIG. 2, the three welding portions 56, 57, and 58 are formed outside of a circle C having a center which coincides with a center G of the bottom portion 51, the circle C having a diameter equivalent to a width D of the negative electrode lead 26. The circle C is a concentric circle of the bottom portion 51. In this case, the width D of the negative electrode lead 26 is defined based on a direction orthogonal to a direction in which the negative electrode lead 26 is extended from the electrode body 22. When the width of the negative electrode lead 26 is not uniform, a width of a part of the negative electrode lead 26 which faces the center of the bottom portion 51 is regarded as the width D of the negative electrode lead 26. In addition, when the bottom portion 51 is viewed from the outside of the exterior package can 50, a cylindrical portion 29a which defines the hollow winding core portion 29 (FIG. 1) of the electrode body 22 approximately coincides with the circle C described above but is not always required to coincide therewith.

Figure 4:
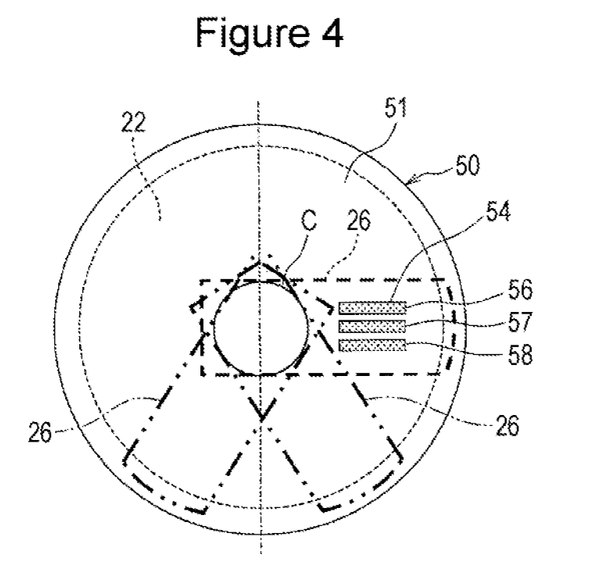
FIG. 4 is a view showing a state in which in FIG. 2, a lead is transferred when the electrode body is rotated in the exterior package can.

FIG. 4 is a view showing the state in which in FIG. 2, when the electrode body 22 is rotated in the exterior package can 50, the negative electrode lead 26 is transferred. Even when the negative electrode lead 26 is rotated together with the electrode body 22 in the exterior package can 50, the circle C described above defines a region in which a front end portion of the negative electrode lead 26 and the bottom portion 51 are overlapped with each other. Accordingly, when the welding portions are formed in an area corresponding to the inside of this circle C, a radiation position of the laser light is not required to be changed in accordance with the change in rotation position of the negative electrode lead 26. On the other hand, when the welding portion is formed only in the area corresponding to the inside of the circle C described above, unlike the case of this embodiment, against a force applied to the welding portion between the exterior package can 50 and the negative electrode lead 26 in a rotation direction of the electrode body 22, this welding strength may still have room for improvement. In this embodiment, since the welding portions 56, 57, and 58 are formed in an area including the outside of the above circle C, as described later, the strength of the welding portion against the force applied to the welding portion in the rotation direction of the electrode body 22 can be improved.

The three welding portions 56, 57, and 58 are each formed in an area of the bottom portion 51 which faces the part of the negative electrode lead 26 which is along the inner surface of the bottom portion 51. The welding portions 56, 57, and 58 each weld the negative electrode lead 26 and the bottom portion 51 by partially melting the negative electrode lead 26 and the bottom portion 51, followed by solidification. The welding portions 56, 57, and 58 are each formed as a molten mark by radiating the laser light 40 (FIG. 1) from the outside of the exterior package can 50 to the bottom portion 51 in a laser radiation step.

As the laser light, laser light of a fiber laser is preferably used. Since a spot diameter of the fiber laser can be significantly decreased, for example, to approximately 0.02 to 0.05 mm, the width of the molten mark formed by this fiber laser can also be significantly decreased to approximately 0.1 mm. Hence, a power density of a focus point of the laser light can be significantly increased.

For example, the three welding portions 56, 57, and 58 may be formed, for example, such that a radiation portion of the laser light 40 is transferred on an outside surface of the bottom portion 51 of the exterior package can 50 toward one side (for example, right side in FIG. 1) along a linear line direction, and this operation is repeatedly performed three times. The welding portions 56, 57, and 58 may be simultaneously formed when the laser light 40 is branched using an optical diffraction grating.

In addition, in the case in which the battery 20 is transferred relatively in a direction orthogonal to the radiation direction of the laser light, when the bottom portion 51 is viewed from the outside of the exterior package can 50, the welding portions 56, 57, and 58 each may be formed to have a straight line shape. In this step, when the battery 20 is disposed while the bottom portion 51 is placed at an upper side, the laser light may be radiated to the bottom portion. When the battery 20 is disposed while being tilted, the laser light may also be radiated to the bottom portion 51.

[Method for Manufacturing Battery]

Next, a method for manufacturing the battery 20 according to this embodiment will be described. First, in the state in which the negative electrode lead 26 is placed to face the inner surface of the bottom portion 51 of the exterior package can 50, the electrode body 22 is received in the exterior package can 50. In the state described above, the positive electrode lead is disposed at an opening portion 52 (FIG. 3) side of the exterior package can 50. In this step, as shown in FIG. 3, of two end surfaces of the electrode body 22 orthogonal to the winding axis of the electrode body 22, on one end surface at a side (front side of the plane in FIG. 3) opposite to the welding portion of the negative electrode lead 26, the position at which the negative electrode lead 26 faces the end surface of the electrode body 22 at a welding portion side is displayed in advance by a marking 60. In FIG. 3, the positive electrode lead is omitted. In the example shown in FIG. 3, the straight-line marking 60 is displayed on the surface of the electrode body 22 so as to extend through a width-direction center of a root 27 side portion which is an outer circumferential side portion of the part of the negative electrode lead 26 which is along the bottom portion 51, from a root 27 side end to a front end 28 side of the negative electrode lead 26. For example, a separator located at the end surface of the electrode body 22 at a positive electrode lead side is ink-jet printed, so that the marking 60 is displayed. The marking 60 may be drawn by an ink or the like. The marking is not limited to have a straight line shape and may have a rectangular shape or the like which indicates the position of the negative electrode lead. Instead of the marking as described above, in order to always dispose the negative electrode lead 26 at a predetermined phase (rotational direction position) before and after the electrode body 22 is inserted in the exterior package can 50, by using a device (not shown), the electrode body 22 and the exterior package can 50 may be configured to be maintained.

Next, after the electrode body 22 is inserted in the exterior package can 50, the electrode body 22 is maintained not to move with respect to the exterior package can 50, and the electrode body 22 is entirely pressurized from the opening portion 52 side of the exterior package can 50, so that the negative electrode lead 26 is brought into close contact with the bottom portion 51 of the exterior package can 50. In the state described above, while the position of the marking 60 is detected by a camera (not shown), by a laser light radiation device (not shown) which includes a control unit to receive a detection signal thus detected, laser light is linearly radiated from the outside of the bottom portion 51 to the part of the bottom portion 51 which faces the negative electrode lead 26. Accordingly, the exterior package can 50 and the negative electrode lead 26 are welded to each other by the welding group 54. In this step, when the bottom portion 51 is viewed from the outside of the exterior package can 50, the welding portions 56, 57, and 58 (FIG. 2) are formed outside of the circle C having the diameter equivalent to the width D (FIG. 2) of the negative electrode lead 26 and the center which coincides with the center G (FIG. 2) of the bottom portion 51. Hence, the negative electrode lead 26 of the electrode body 22 and the exterior package can 50 are welded to each other at a position far apart from the winding center axis O (FIG. 1) which is a rotation center of the electrode body 22 to the outer circumferential side. An extension line of the winding center axis O coincides with the center G of the bottom portion 51. Hence, when a force is applied in a direction to rotate the electrode body 22 with respect to the exterior package can 50, the moment of a force applied to the welding portions 56, 57, and 58 between the exterior package can 50 and the negative electrode lead 26 in the rotation direction can be decreased as compared to that in the case in which the welding portions are located in the vicinity of the center of the bottom portion 51. Hence, against the force applied to the welding portions between the exterior package can 50 and the negative electrode lead 26 in the rotation direction of the electrode body 22, the strength of the welding portions can be improved.

In addition, on the end surface of the electrode body 22 opposite to the welding portion of the negative electrode lead 26, as described above, the marking 60 indicating the position of the part of the negative electrode lead 26 which is along the bottom portion 51 is displayed. In addition, while the position of the marking 60 is detected, since the laser light is radiated from the outside of the bottom portion 51 to the part of the bottom portion 51 which faces the negative electrode lead 26, the exterior package can 50 and the negative electrode lead 26 are welded to each other by the welding group 54. Hence, in the state in which the negative electrode lead 26 is not observed from the outside of the exterior package can 50, while the position of the negative electrode lead 26 is precisely detected, the laser light can be radiated to the position which faces the negative electrode lead 26 and which is far apart from the winding center axis O of the electrode body 22 to the outer circumferential side. Accordingly, the battery 20 can be manufactured in high precision to have a high welding strength against the force applied to the welding portion between the exterior package can 50 and the negative electrode lead 26 in the rotation direction of the electrode body 22. In addition, according to the structure of this example, a front end of the part of the negative electrode lead 26 which is along the bottom portion 51 of the exterior package can 50 is not required to be elongated so as to be located at a position close to the winding center axis O. As a result, the cost of the battery 20 can be reduced.

Next, results of experiments performed to confirm the effects of the above embodiments will be described. In the experiments, a battery formed by a method for manufacturing a battery according to each of the following examples 1 and 2 and comparative example was used.

Example 1

With reference to FIG. 2, in Example 1, in the state in which the bottom portion 51 was viewed from the outside, the welding portions 56, 57, and 58 were formed to have three straight line shapes extending to the outside in the radius direction from a position as a starting point apart from the center G of a can bottom surface by 4 mm to the outside in the radius direction. The welding portions 56, 57, and 58 each had a longitudinal direction dimension of 1 mm and a short side dimension width of 0.08 mm, and the pitch between the straight lines was 0.5 mm. In Example 1, the other structures were similar to those shown in FIGS. 1 to 4.

In Example 1, under the conditions described above, when a force was applied to the electrode body 22 in a direction so as to rotate the electrode body 22 with respect to the exterior package can 50, a torque strength, that is, a strength against a force applied to the welding group 54 in the rotation direction was confirmed by calculation. As a result, the torque strength was 150 N·mm or more.

Example 2

Figure 5:
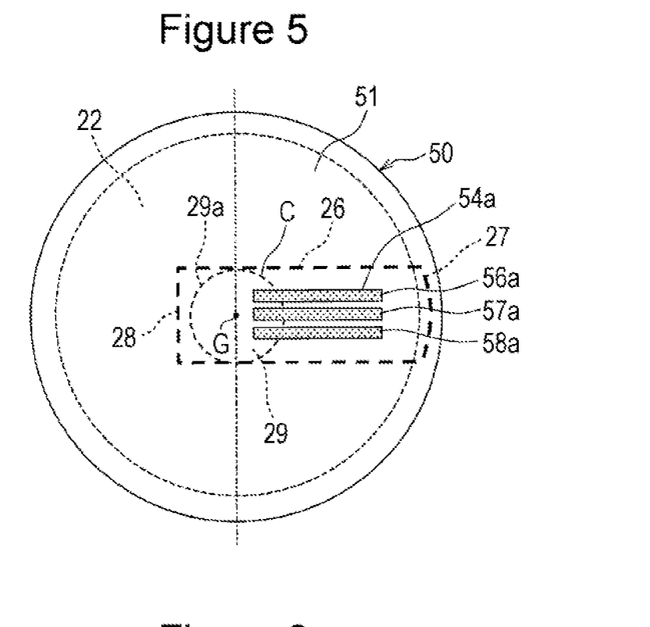
FIG. 5 is a view showing a cylindrical battery according to another example of the embodiment, the battery corresponding to that shown in FIG. 2.

With reference to FIG. 5, in Example 2, a welding group 54*a* was formed from three welding portions 56*a*, 57*a*, and 58*a*. In the state in which the bottom portion 51 was viewed from the outside, the welding portions 56*a*, 57*a*, and 58*a* were formed to have three straight line shapes extending to the outside in the radius direction from a position as a starting point apart from the center G of the can bottom surface by 2 mm to the outside in the radius direction. The welding portions 56*a*, 57*a*, and 58*a* each had a longitudinal direction dimension of 2 mm and a short side dimension width of 0.08 mm, and the pitch between the straight lines was 0.5 mm. In Example 2, unlike the case of Example 1, in the bottom portion 51, the three welding portions 56*a*, 57*a*, and 58*a* were each formed both in the inside and the outside of the circle C so as to across the circle C having the diameter equivalent to the width of the negative electrode lead 26 in the radius direction. In Example 2, the other structures were similar to those of Example 1.

In Example 2, under the conditions described above, a torque strength of the welding group 54*a* obtained when a force was applied to the electrode body 22 in a direction so as to rotate the electrode body 22 with respect to the exterior package can 50 was confirmed by calculation. As a result, the torque strength was 150 N·mm or more.

Comparative Example

Figure 6:
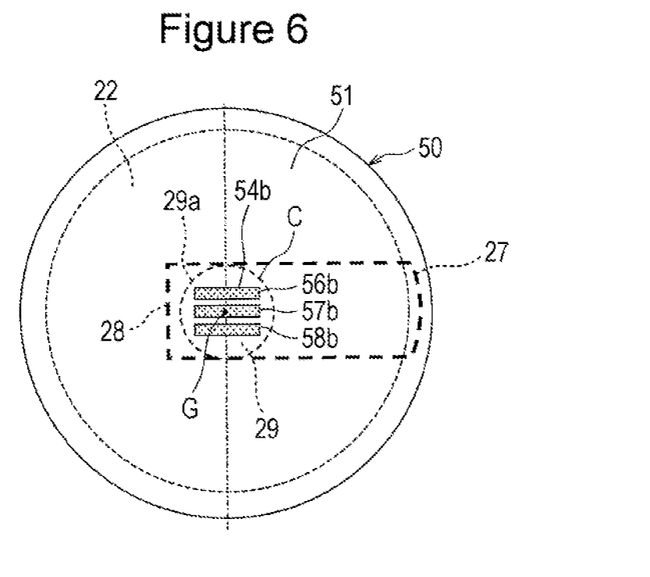
FIG. 6 is a view showing a cylindrical battery according to a comparative example of the embodiment, the battery corresponding to that shown in FIG. 2.

With reference to FIG. 6, in Comparative Example, a welding group 54*b* was formed from three welding portions 56*b*, 57*b*, and 58*b*. In the state in which the bottom portion 51 was viewed from the outside, as the welding portions 56b, 57b, and 58b, a straight line-shaped welding portion 57b passing through the center G of the can bottom surface and equally extending to the two sides of this center G in the radius direction and two straight line-shaped welding portions 56b and 58b provided at the two sides of the above welding portion 57b and in parallel thereto were formed. The welding portions 56b, 57b, and 58b each had a longitudinal direction dimension of 1 mm and a short side dimension width of 0.08 mm, and the pitch between the straight lines was 0.5 mm. In this Comparative Example, the other structures were similar to those of Example 1.

In Comparative Example, under the conditions described above, a torque strength of the welding group 54b obtained when a force was applied to the electrode body 22 in a direction so as to rotate the electrode body 22 with respect to the exterior package can 50 was confirmed by calculation. As a result, the torque strength was 30 N·mm.

Accordingly, it was confirmed that in Examples 1 and 2, the torque strength of the welding group could be significantly increased as compared to that in Comparative Example.

Figure 7:
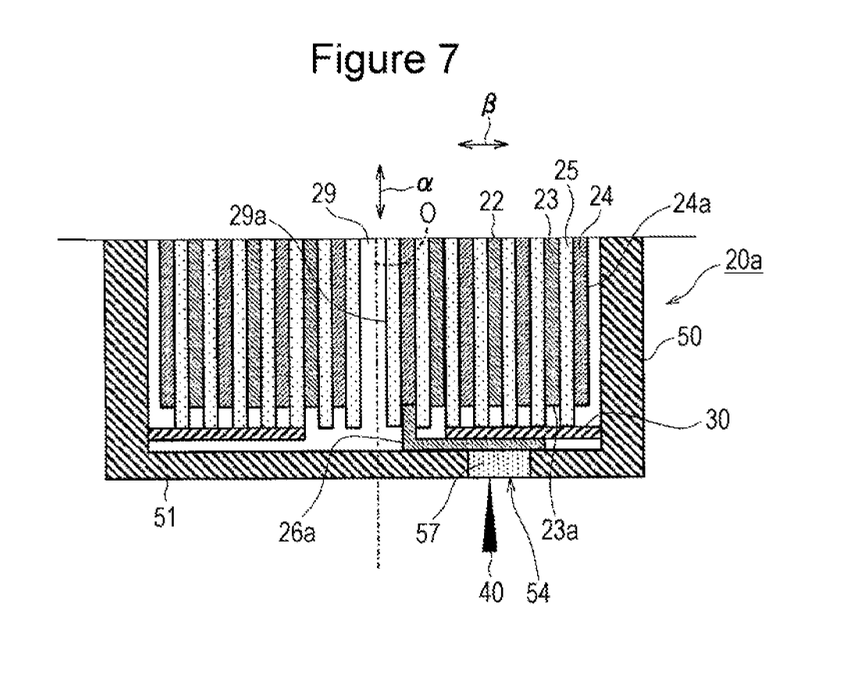
FIG. 7 is a view showing a cylindrical battery according to another example of the embodiment, the battery corresponding to that shown in FIG. 1.

FIG. 7 is a view showing a battery 20a according to another example of the embodiment, the battery 20a corresponding to that shown FIG. 1. In the structure of this example, a negative electrode lead 26a was connected to a winding-start side end portion of the negative electrode 24 instead of the winding-finish side end portion of the negative electrode 24. This negative electrode lead 26a was bent at an approximately right angle near the bottom portion 51 to the outer circumferential side of a cylindrical portion of the exterior package can 50 and was disposed along the inner surface of the bottom portion 51. A part of the negative electrode lead 26a along the inner surface of the bottom portion 51 was overlapped on the inner surface of the bottom portion 51 and was brought into contact with this inner surface. In addition, in the state described above, since the laser light 40 was radiated to a part of the bottom portion 51 facing the negative electrode lead 26a from the outside of the exterior package can 50, the exterior package can 50 and the negative electrode lead 26a were welded to each other with the welding group 54. In this example, the other structures and functions were similar to those shown in FIGS. 1 to 4.

Figure 8:
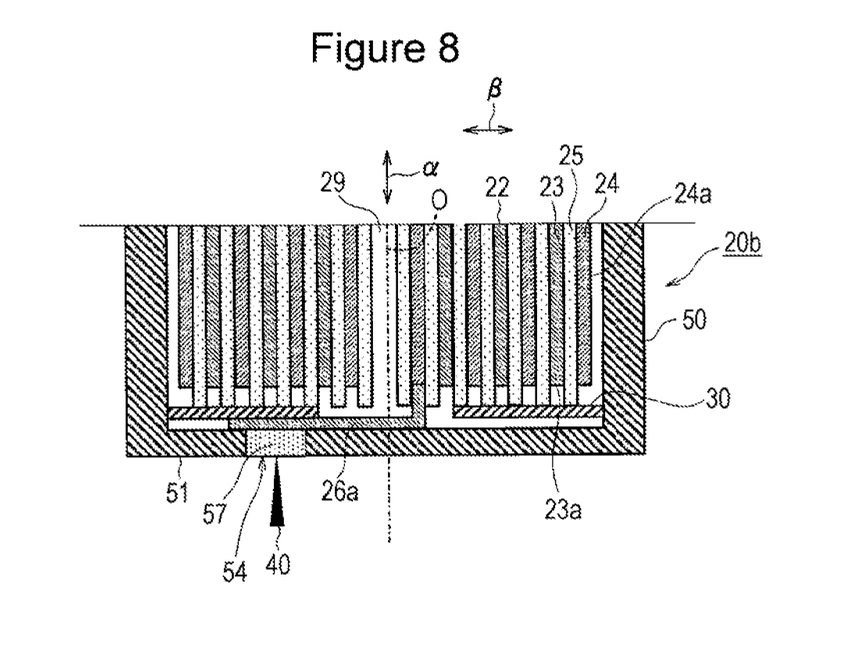
FIG. 8 is a view showing a cylindrical battery according to another example of the embodiment, the battery corresponding to that shown in FIG. 1.

FIG. 8 is a view showing a battery 20b according to another example of the embodiment, the battery 20b corresponding to that shown FIG. 1. In the structure of this example, as was the battery 20a shown in FIG. 7, a negative electrode lead 26a was connected to the winding-start side end portion of the negative electrode 24. This negative electrode lead 26a was bent at an approximately right angle near the bottom portion 51 to an inner circumferential side of the cylindrical portion of the exterior package can 50 and was disposed along the inner surface of the bottom portion 51. A part of the negative electrode lead 26a along the inner surface of the bottom portion 51 was overlapped on the inner surface of the bottom portion 51 and was brought into contact with this inner surface. In addition, in the state described above, since the laser light 40 was radiated to a part of the bottom portion 51 facing the negative electrode lead 26a from the outside of the exterior package can 50, the exterior package can 50 and the negative electrode lead 26a were welded to each other with the welding group 54. In this example, the other structures and functions were similar to those shown in FIGS. 1 to 4.

In each of the examples described above, although the case in which the negative electrode lead 26 and 26a are each welded to the exterior package can 50 with the welding group formed of the three welding portions has been described, the present disclosure is not limited thereto. For example, the negative electrode lead and the exterior package can may be welded to each other with a welding group formed of two or at least three welding portions or with only one welding portion.

In each of the examples described above, although the case in which the negative electrode lead is welded to the exterior package can by radiation of energy beams has been described, the structure of the present disclosure may also be applied to the case in which the negative electrode lead is welded to the exterior package can by resistance welding. In addition, in each of the examples described above, although the case in which the negative electrode lead connected to the negative electrode is welded to the exterior package can has been described, the structure of the present disclosure may also be applied to the case in which the positive electrode lead connected to the positive electrode is welded to the exterior package can.

REFERENCE SIGNS LIST 20, 20a, 20b cylindrical battery (battery), 22 electrode body, 23 positive electrode, 23a positive electrode collector, 24 negative electrode, 24a negative electrode collector, 25 separator, 26, 26a negative electrode lead, 27 root, 28 front end, 29 winding core portion, 29a cylindrical portion, 30 insulating plate, 40 laser light, 50 exterior package can, 51 bottom portion, 54, 54a, 54b welding group, 56, 56a, 56b, 57, 57a, 57b, 58, 58a, 58b welding portion, 60 marking

The invention claimed is:

1. A cylindrical battery comprising:
    an electrode body in which a positive electrode and a negative electrode are spirally wound with a separator interposed therebetween; and
    a bottom-closed cylindrical exterior package can which receives the electrode body,
    wherein a lead connected to one of the positive electrode and the negative electrode is extended from the electrode body and is welded to a bottom potion of the exterior package can, and
    when the bottom portion is viewed from the outside of the exterior package can, an entirety of a welding portion between the lead and the bottom portion formed by a molten mark is formed outside of a concentric circle of the bottom portion having a diameter equivalent to the width of the lead orthogonal to a direction extended from the electrode body, and
    the welding portion includes three or more welding portions each formed in a straight line shape along a radius direction of the bottom portion.

2. A method for manufacturing the cylindrical battery according to claim 1,
    wherein, of two end surfaces of the electrode body orthogonal to a winding axis thereof, on one end surface opposite to the welding portion, a marking which indicates a position of the lead facing the other end surface is displayed, and while the marking is detected, energy beams are radiated from the outside of the bottom portion to a part of the bottom portion which faces the lead to form the welding portion.

* * * * *